United States Patent [19]

Dellecker

[11] Patent Number: 5,695,058
[45] Date of Patent: Dec. 9, 1997

[54] SLEEVE AND METHOD FOR PACKAGING CUT FOLIAGE

[76] Inventor: William M. Dellecker, 316 River Bluff Dr., Ormond Beach, Fla. 32174

[21] Appl. No.: 694,691
[22] Filed: Aug. 9, 1996
[51] Int. Cl.⁶ ................................................ A01G 5/02
[52] U.S. Cl. ............................ 206/423; 383/907
[58] Field of Search ........................ 206/423, 457; 383/907; 229/87.06; 47/72; 53/397, 473, 475, 476; 493/186, 189, 264

[56] References Cited

U.S. PATENT DOCUMENTS 4,333,267  6/1982  Witte ..................... 206/423 X
5,388,695  2/1995  Gilbert ..................... 206/423

*Primary Examiner*—Jacob K. Ackun
*Attorney, Agent, or Firm*—Allen, Dyer, Doppelt, Milbrath & Gilchrist, P.A.

[57] ABSTRACT

A protective sleeve for packaging cut foliage such as fern fronds is formed from two flexible, generally triangular sheets joined along two side edges to form an inverted conical enclosure having a pointed top end. The bottom edges are joinable with an adhesive tape after inserting the cut foliage. An aperture is provided along the bottom for permitting the stem to protrude therefrom to permit watering.

19 Claims, 2 Drawing Sheets

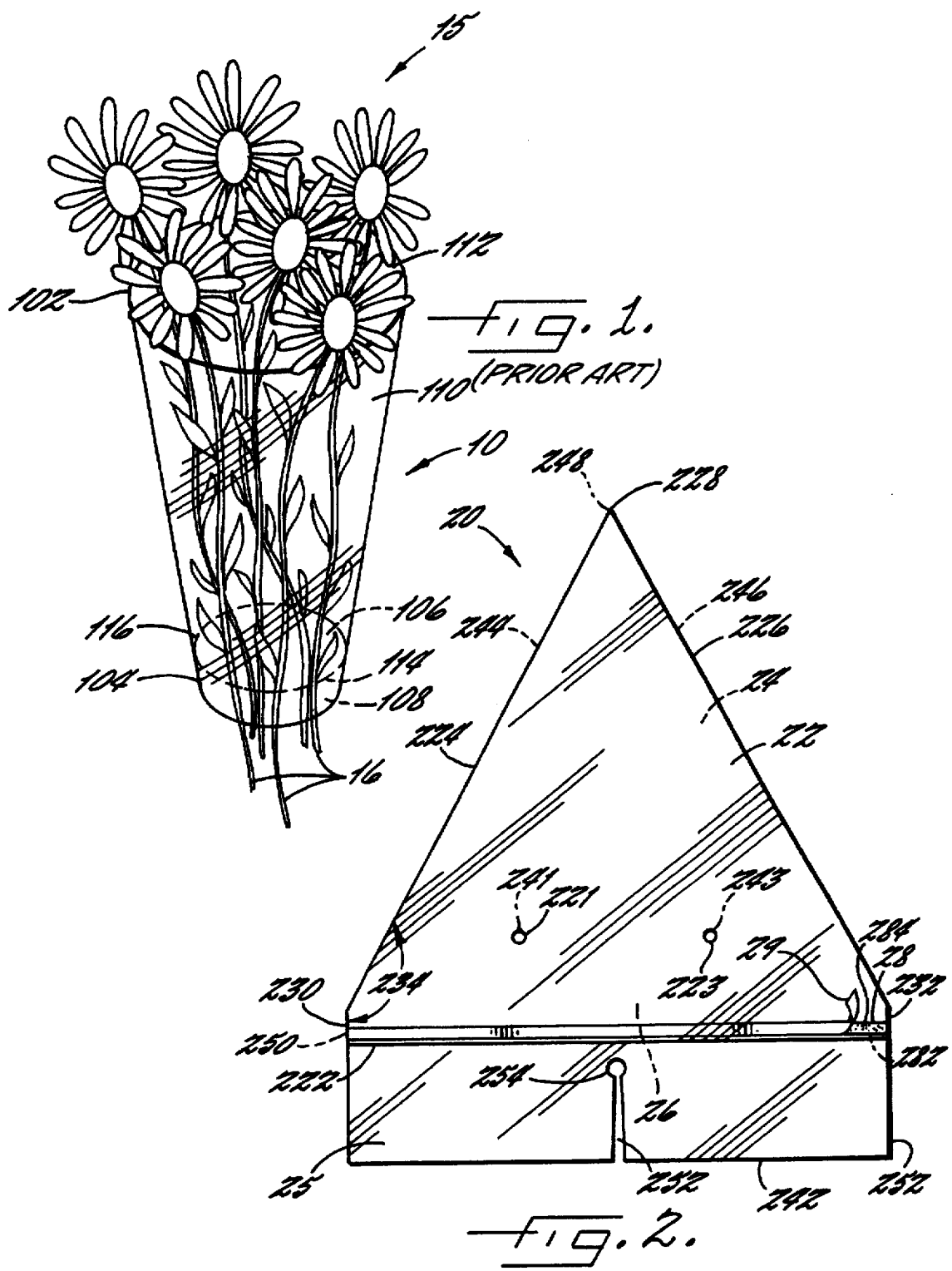

SLEEVE AND METHOD FOR PACKAGING CUT FOLIAGE

BACKGROUND OF THE INVENTION

1. Field of the Invention

The present invention relates to packaging devices and methods for cut foliage, and, more particularly, to packaging devices and methods for fern.

2. Description of Related Art

Foliage typically passes through a series of hands between the harvester and the retail purchaser's display. As cut foliage has a finite shelf-life and is relatively fragile, the foliage industry has utilized many devices and methods to protect freshness and reduce breakage. Broken and wilted foliage is of little use in the marketplace; therefore, it is an important to be able to protect the product between harvesting and delivery to the consumer.

The floral industry has been changing significantly in recent times at the point of purchase. As flowers and foliage have been making incursions into supermarkets, it has become advantageous to be able to offer cut foliage such as ferns either individually or in small bunches to permit a consumer to make his or her own floral arrangement.

Until now, cut foliage such as ferns has been transported in large bunches of, for example, 20–50 fronds that are banded together but are not packaged. Such bunches are not attractive for presentation at the retail level in, for instance, a bucket-type display. In addition, the potential for breakage in such large bunches is quite high, and transpiration continues, limiting shelf life.

A sleeve 10 that has been used in the art to protect cut foliage and flowers is illustrated in FIG. 1. Such a sleeve 10 comprises a pyramidal-shaped double layer 110,112 of clear plastic joined along the sides 111. The sleeve 10 when empty lies flat is openable to provide a funnel-shaped package for receiving the foliage 15, usually with the stems 16 entering at the wider open top end 102.

The stems 16 typically protrude out of an aperture 106 at the narrower bottom end 104, which provides the ability to water the foliage 15. A flap 108 may also be provided on a first one 110 of the plastic layers. The flap 108 may perhaps have scores 114 adjacent the bottom edge 116 of the second plastic layer 112, to facilitate folding the flap 108, which can be used, for example, during transport of the foliage 15 when watering is not possible, thereby hindering water leakage.

This type of sleeve 10 is useful for transporting and protecting foliage 15 having a shape adapted for packaging in an inverse-pyramidal-shaped vessel, such as cut flowers.

SUMMARY OF THE INVENTION

It is an object of the present invention to provide a sleeve adapted to protect cut foliage against damage during transport and storage.

It is another object to provide such a sleeve adapted to permit watering during transport and storage.

It is a further object to provide such a sleeve adapted to preserve freshness, prevent drying out, and extend shelf life.

It is an additional object to provide such a sleeve for presenting an attractive appearance at the point of purchase.

It is yet another object to provide such a sleeve for packaging small numbers of pieces of cut foliage for offering at the retail level.

It is yet a further method for protecting cut foliage during transport and storage.

It is yet another object to provide a method of making a protective sleeve for cut foliage.

These and other objects are achieved by the sleeve and method for packaging cut foliage, and the method of making the sleeve, of the present invention.

The protective sleeve comprises two flexible, generally triangular sheets: The first sheet has a bottom edge and two side edges that meet at a generally pointed top end. The second sheet has a bottom edge and two side edges that also meet at a generally pointed top end. Each side edge of the second sheet is sealingly joined to a corresponding one of the first sheet side edges, which serves to form an inverted conical enclosure. The resulting inner space between the two sheets is defined by the joined side edges of the two sheets.

The sleeve further comprises means for joining at least a portion of the sheets' bottom edges together. This joining forms an enclosed protective space, and generally is undertaken after insertion of the cut foliage.

The method for forming such a sleeve comprises the steps of providing two generally triangular-shaped sheets of flexible plastic. The first sheet has a flap extending below the bottom edge of the second sheet. The flap has a generally centrally located, upwardly extending slit therein. The sheets are sealed together along two side edges to form an inverted conical sleeve having a sealed pointed top end. An adhesive tape is affixed generally adjacent the second sheet's bottom edge, and a protective tape is removably affixed atop the adhesive tape so that sealing may be accomplished when desired, generally following an insertion of the foliage into the sleeve.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 1 illustrates a previously used sleeve for packaging foliage.

FIG. 2 illustrates the cut foliage sleeve.

DETAILED DESCRIPTION OF THE PREFERRED EMBODIMENTS

Figure 3:
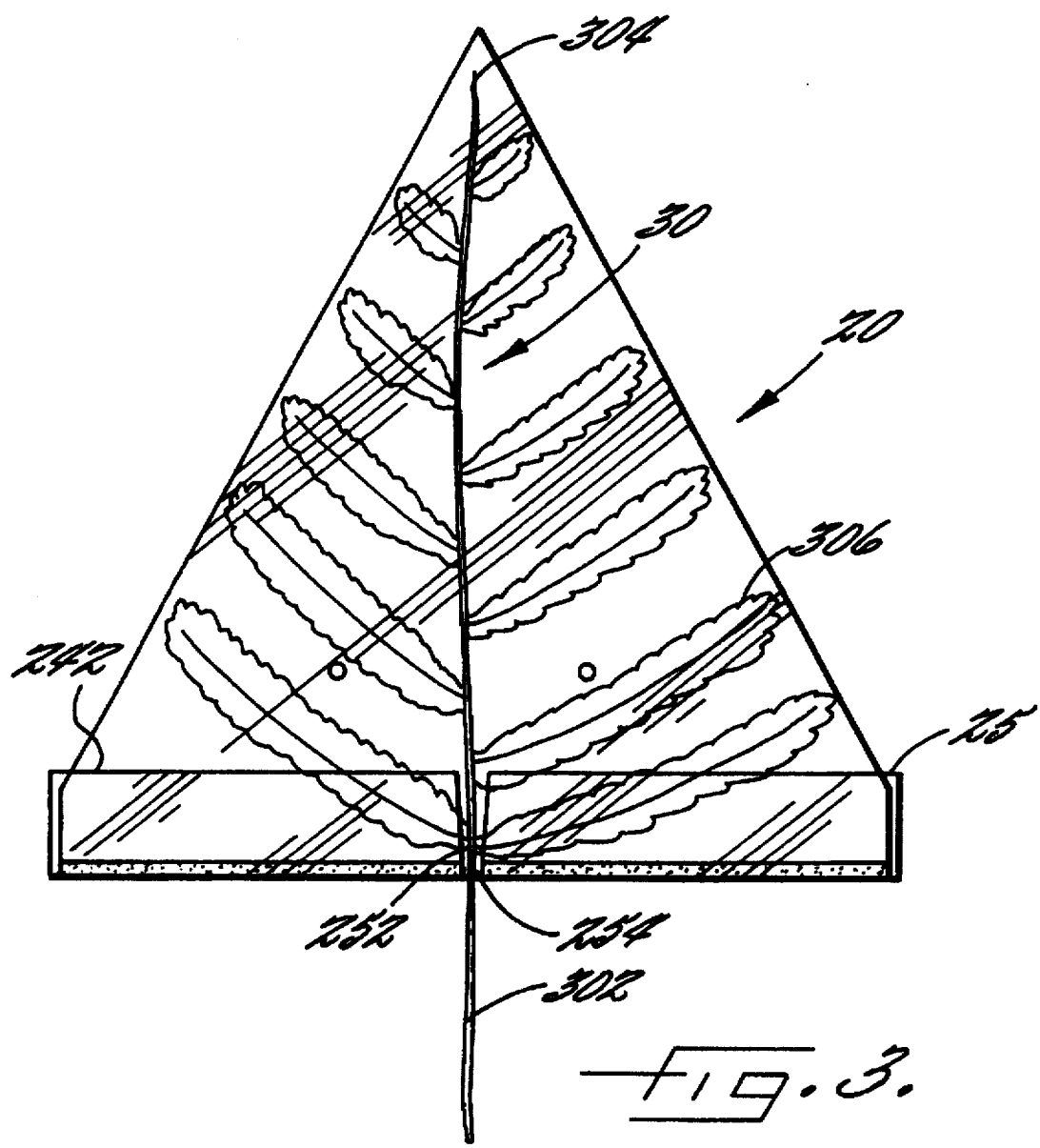
FIG. 3 illustrates the cut foliage sleeve containing a fern and protectively sealed.

A description of the preferred embodiments of the present invention will now be presented with reference to FIGS. 2 and 3.

The protective sleeve 20 is for packaging cut foliage, and is particularly effective for foliage such as ferns 30, which have generally triangular-shaped bodies 306, with stems 302 protruding from the base of the triangle and a generally pointed distal tip 304.

The structure of the sleeve 20 is shown in FIG. 2. A first generally clear plastic sheet 22 has a generally straight bottom edge 222. Two top side edges 224, 226 meet at a generally pointed top end 228. Two generally parallel bottom side edges 230, 232 meet the corresponding top side edges 224, 226 at an oblique angle 234.

A second generally clear plastic sheet 24 also has two top side edges 244, 246 that meet at a generally pointed top end 248. Similarly, two generally parallel bottom side edges 250, 252 meet the top side edges 244, 246 at the same oblique angle 234.

The top 224, 226 and bottom 230, 232 side edges of the first sheet 22 are sealingly joined, such as by heat sufficient to melt the plastic together, to the corresponding top 244, 246 and bottom 250, 252 side edges of the second sheet. This forms an inverted, generally conical enclosure that has an inner space 26 defined by the aforementioned joined side edges.

The second sheet 24 has a lower portion that extends below the first sheet's bottom edge 222. This lower portion forms a flap 25 having a bottom edge 242. The flap 25 has an upwardly extending slit 252 therein, which in use forms an aperture 254 for permitting a stem 302 of the cut foliage (e.g., fern 30) to protrude therefrom when the sheets' bottom edges 222, 242 are joined together (FIG. 3).

At the top of the slit 252 is a hole 254 that extends through the second sheet 24. This hole 254 is for protecting the sheet against ripping beyond the top of the slit 252, which otherwise could easily occur during handling.

The sleeve 20 further comprises means for joining at least a portion of the sheets' bottom edges 222, 242 together. This permits the formation of an enclosed protective space after insertion of the cut foliage. In a preferred embodiment the joining means comprises means for affixing the flap 25 to the first sheet 22. Particularly, this comprises an adhesive tape 28 that has a first side 282 affixed adjacent the first sheet's bottom edge 222 and a second adhesive side 284 facing away from the first sheet 22.

In a preferred embodiment the affixing means additionally comprises a protective tape 29 that is removably affixed to the adhesive tape's second side 284. This protective tape 29 is for shielding the adhesive tape's second side 284 until a joining of the sheets' bottom edges 222, 242 is desired.

A further feature of the sleeve 20 is the provision of venting means in at least one of the sheets 22, 24. In the preferred embodiment shown in FIG. 2, two pairs of holes 221, 241 and 223, 243 extend through the first and the second sheet, one pair on either side of a center of the sleeve 20. These holes are found to be advantageous for several reasons: They provide limited gas exchange but no liquid water loss; they prevent the foliage from drying out; they prevent the sleeve from fogging (internal condensation) during use; and they reduce transpiration of the plant, which increases shelf-life.

As can be seen with reference to FIG. 3, a fern 30 can be protected with the use of the sleeve 20 of the present invention by inserting the fern's distal tip 304 into the inner space 26 until the distal tip 304 is positioned generally adjacent the joined pointed top ends 228, 248 of the sheets 22, 24. The fern's stem 302 is positioned atop the slit 252 in the flap 25. Finally, the flap 25 is sealed to the first sheet 22 by removing the protective tape 29 to expose the adhesive side 284 of the adhesive tape 28 and pressing the flap 25 thereagainst. The stem 302 is positioned to protrude from the aperture 254 formed by the slit 252 after the flap 25 is sealed to the first sheet 22.

It should be noted that, while the sleeve 20 of FIG. 3 is indicated as being transparent, it is obvious to one skilled in the art that this is not intended as a limitation. It should also be noted that, although a fern is depicted in FIG. 3, the sleeve 20 and methods of the present invention are considered useful for other cut foliage as well.

It may be appreciated by one skilled in the art that additional embodiments may be contemplated, including similarly conceived protective sleeves for differently shaped cut foliage.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A protective sleeve for packaging cut foliage comprising:

a first flexible sheet having a bottom edge and two side edges meeting at a generally pointed top end;

a second flexible sheet having a bottom edge and two side edges meeting at a generally pointed top end, each side edge sealingly joined to a corresponding one of the first sheet side edges to form an inverted conical enclosure having an inner space defined by the joined side edges of the first sheet and the second sheet; and means for joining at least a portion of the bottom edges of the first sheet and the second sheet together, for forming an enclosed protective space after insertion of the cut foliage.

2. The protective sleeve recited in claim 1, wherein:

the joining means joins two side portions of the first sheet and the second sheet bottom edges; and the second sheet has aperture means therein for permitting a stem of the cut foliage to protrude therefrom when the first sheet and the second sheet bottom edges are joined together.

3. The protective sleeve recited in claim 1, wherein:

the second sheet has a lower portion extending below the first sheet bottom edge, the lower portion for forming a flap; and the joining means comprises means for affixing the flap to the first sheet.

4. The protective sleeve recited in claim 3, wherein the flap has an upwardly extending slit therein for permitting a stem of the cut foliage to protrude therefrom when the first sheet and the second sheet bottom edges are joined together.

5. The protective sleeve recited in claim 4, wherein the flap further has a hole therethrough positioned at a top of the slit for protecting the second sheet against ripping beyond the top of the slit during handling.

6. The protective sleeve recited in claim 3, wherein the affixing means comprises an adhesive tape having a first side affixed adjacent the bottom edge of the first sheet and a second side having adhesive properties facing away from the first sheet.

7. The protective sheet recited in claim 6, wherein the affixing means further comprises a protective tape removably affixed to the adhesive tape second side, for shielding the adhesive tape second side until a joining of the first sheet and the second sheet bottom edges is desired.

8. The protective sheet recited in claim 1, wherein at least one of the first sheet and the second sheet has a hole therethrough for providing a limited air exchange during use between the cut foliage and an external atmosphere, for limiting water vapor loss, and for preventing a development of condensation on an inner surface of the sleeve.

9. A protective sleeve for packaging cut foliage comprising:
- a first generally clear plastic sheet having a generally straight bottom edge, two top side edges meeting at a generally pointed top end, and two generally parallel bottom side edges meeting the top side edges at an oblique angle;
- a second generally clear plastic sheet having a bottom edge, two top side edges meeting at a generally pointed top end, and two generally parallel bottom side edges meeting the corresponding top side edges at an oblique angle, the top side edge and the bottom side edge of the first sheet sealingly joined to the corresponding top side edge and the corresponding bottom side edge of the second sheet to form an inverted generally conical enclosure having an inner space defined by the joined top and bottom side edges of the first sheet and the second sheet; and
- means for joining at least a portion of the bottom edges of the first sheet and the second sheet together, for forming an enclosed protective space after insertion of the cut foliage.

10. The protective sleeve recited in claim 9, wherein:
- the second sheet has a lower portion extending below the first sheet bottom edge, the lower portion for forming a flap; and
- the joining means comprises means for affixing the flap to the first sheet.

11. The protective sleeve recited in claim 10, wherein the flap has an upwardly extending slit therein for permitting a stem of the cut foliage to protrude therefrom when the first sheet and the second sheet bottom edges are joined together.

12. The protective sleeve recited in claim 11, wherein the flap further has a hole therethrough positioned at a top of the slit for protecting the second sheet against ripping beyond the top of the slit during handling.

13. The protective sleeve recited in claim 11, wherein the affixing means comprises an adhesive tape having a first side affixed adjacent the bottom edge of the first sheet and a second side having adhesive properties facing away from the first sheet.

14. The protective sheet recited in claim 13, wherein the affixing means further comprises a protective tape removably affixed to the adhesive tape second side, for shielding the adhesive tape second side until a joining of the first sheet and the second sheet bottom edges is desired.

15. The protective sheet recited in claim 9, wherein at least one of the first sheet and the second sheet has a hole therethrough for providing a limited air exchange during use between the cut foliage and an external atmosphere, for limiting water vapor loss, and for preventing a development of condensation on an inner surface of the sleeve.

16. A method for protecting cut foliage comprising the steps of:
- sealing two generally triangular shaped sheets together along two side edges to form an inverted conical sleeve having a sealed pointed top end;
- inserting a piece of cut foliage into the sleeve, a top of the cut foliage inserted so that the pointed top end is adjacent thereto; and
- partially sealing the third edges of the sheets together to enclose a body of the cut foliage, leaving an aperture therebetween for a stem of the cut foliage to protrude therefrom.

17. The method recited in claim 16, further comprising the step, following the sealing step, of puncturing at least one of the sheets to provide a vent for gas exchange and for preventing a fogging of the sleeve.

18. A method for forming a sleeve for protecting cut foliage comprising the steps of:
- providing two generally triangular-shaped sheets of generally clear, flexible plastic, a first one of the sheets having a flap extending below a bottom edge of a second one of the sheets, the flap having a generally centrally located, upwardly extending slit therein;
- sealing the sheets together along two side edges to form an inverted conical sleeve having a sealed pointed top end;
- affixing an adhesive tape generally adjacent the second sheet bottom edge; and
- removably affixing a protective tape atop the adhesive tape.

19. The method recited in claim 18, further comprising the step, following the sealing step, of puncturing at least one of the sheets to provide a vent for gas exchange and for preventing a fogging of the sleeve during use.

* * * * *